Nov. 1, 1927.  
G. L. DANFORTH, JR  
1,647,213  
OPEN HEARTH FURNACE  
Filed Jan. 21, 1921  
2 Sheets-Sheet 1

Witness  
R. Burkhardt

Inventor:  
George L. Danforth Jr.  
By D. Anthony Usina  
atty.

Nov. 1, 1927.

G. L. DANFORTH, JR

OPEN HEARTH FURNACE

Filed Jan. 21, 1921

Inventor:
George L. Danforth Jr.

Witness:
R. Burkhardt.

Patented Nov. 1, 1927.

1,647,213

UNITED STATES PATENT OFFICE.

GEORGE L. DANFORTH, JR., OF CHICAGO, ILLINOIS, ASSIGNOR, BY MESNE ASSIGNMENTS, TO OPEN HEARTH COMBUSTION COMPANY, OF CHICAGO, ILLINOIS, A CORPORATION OF DELAWARE.

OPEN-HEARTH FURNACE.

Application filed January 21, 1921. Serial No. 438,967.

This invention relates to a new and improved open hearth furnace, and more particularly to a construction adapted to so introduce, commingle and direct the entering gases and air in an open hearth furnace as to produce a quick burning, intensely hot flame adapted to provide working heat adjacent the full surface of the metal in the furnace, and further adapted to exhaust the products of combustion through a port of small area with the minimum resistance.

My invention comprises an improvement in that portion of an open hearth furnace which relates to the air and gas entrance passages and the adjacent portion of the melting chamber, the remainder of the furnace and its appurtenances being of usual construction, with the addition that auxiliary means for producing pressure on the incoming air and draft upon the exhaust may be used jointly or separately if desired under certain circumstances.

As is well known in open hearth practice, the furnace is double-ended and provided with duplicate regenerating chambers. The furnace is periodically reversed in its operation so that the heated exhaust gases and the incoming gas and comparatively cool incoming air alternately pass through the regenerative chambers. The incoming air and gas are thus heated to a high temperature before their entrance into the melting chamber and the heat of the furnace flame is correspondingly increased.

In furnaces of this character as now generally constructed, the gas and air enter through separate ports at each end of the melting chamber, the same ports serving alternately to permit the passage of the outgoing burnt gases. Valves are provided in the several air and gas passages leading to these ports in order to accomplish this reversal in the direction of movement of the air and gas. The furnaces are normally approximately rectangular in shape, the ends upon which the gas and air enter being smaller in dimension than the sides.

The air in some furnaces heretofore designed has been introduced both laterally of the entering gas stream and also extending above it. These existing types of furnace do not, however, provide sufficient intermingling of the air and gas before they enter the melting chamber or immediately after they enter the chamber. The intermixture in general occurs gradually as the gases pass across the furnace, the lighter gas gradually rising through and intermingling with the heavier air, combustion thus gradually taking place. This results in an unequal heating of the metal in the melting chamber, and upon observation of the metal therein, it will be noted that that portion of the bath adjacent the incoming ports is markedly darker than that adjacent the outgoing ports. The incoming air and gas, although preheated, are not at a temperature adapted to properly operate upon the metal without the additional heat of combustion, and sufficient combustion does not take place until well into the melting chamber from the entrance. This action results in properly heating and melting only a portion of the charge during each reversal of the operation of the furnace, that portion adjacent the fuel entry ports not being adequately acted upon. Thus when the furnace is reversed the portion more distant from the incoming ports having previously been permitted to become relatively cool must be brought up to the working temperature before the proper action takes place. These features of the operation of the furnace cause it to work at much less than the maximum possible efficiency.

This late combustion in the melting chamber also results in great heat loss through the exhaust ports and in rapid deterioration of these ports due to the excessive heat.

Since the same ports serve at different periods both as inlet and exit ports and the gases produced by the combustion in the furnace exceed in volume the elements producing the combustion, the size required for proper passage of the outgoing gases is the major factor in determining the size of the several ports.

It is an object of the present invention to provide an open hearth furnace having a new and improved port construction particularly adapted to insure a mixture of the incoming air and gas adequate to secure quick combustion and thus insure a substantially uniform operating temperature throughout the furnace.

It is a further object to provide ports of this character whose shape, coacting with the form of the adjacent portion of the melting chamber, causes the ports, when serving as outlets upon the reversal of the furnace, to permit and assist in ready passage of the outgoing products of combustion.

It is an additional object to provide a construction of the character described which may be applied to existing furnaces without material alteration therein.

Other and further objects will appear as the description proceeds.

In a specific embodiment, my invention comprises the provision of a gas port with a juxtaposed air port, the ports joining to form a single effective port entering the melting chamber. This effective port is preferably less in area than the total area of the several ports joining to form it and of the passages leading thereto. With this port arrangement, the gas, which enters with a velocity caused by pressure, has an aspirating effect upon the air coming from the adjacent port and thus minimizes any necessity for the use of auxiliary pressure producing means in conection with the incoming air passages, due to their relatively small size. This aspirating effect also aids in intermingling the air and gas. The aspirating effect is self-regulating in that when the gas is introduced under more pressure and consequently with greater velocity, more air is induced and with lower gas pressure the air supplied is correspondingly decreased. The melting chamber is also provided with necked-down ends adjacent this port.

In ports and passages of this character, although designed with particular reference to mixing the air and gas, the limiting factor is the provision of proper outlet for the burnt gases. The gas exhaust may be caused simply by the usual stack draft or supplemented by mechanical means. Obviously the gases may be borne through practically any type of port by forced draft, and an economical and efficient design will be one wherein the increased draft necessitated does not require an expenditure of power unwarranted by the increased efficiency of operation secured by the proper mixing and introduction of the gases. Another factor entering into high draft methods lies in the losses due to cold air being sucked in through the various crevices in the walls of the passages and chambers. In order to minimize the draft required, I have provided a port built upon the lines of a Venturi section, the lateral walls of the melting chamber converging toward the port proper, the roof inclining downwardly and floor sloping upwardly toward the port. Similarly the air and gas passages beyond the port also diverge from the port, thus providing a reduced port or passageway having similar converging and diverging sections. The greater velocity created in this relatively small passageway aids in mixing the air and gas and produces a flame so directed as to cause the heating of the metal in the chamber to be accomplished more by convection and less by radiation.

This Venturi section construction affords not only a proper mixture of the incoming air and gas, producing an efficient combustion, but also secures the exhaust of the products of combustion without the necessity for a greatly increased draft in spite of the material reduction in the actual port area.

I have illustrated a preferred embodiment of my invention in the accompanying drawings, in which—

The general construction of the regenerative chambers, air and gas valves and other associated structures forms no portion of my invention and these elements may be of any usual construction.

Figure 1:
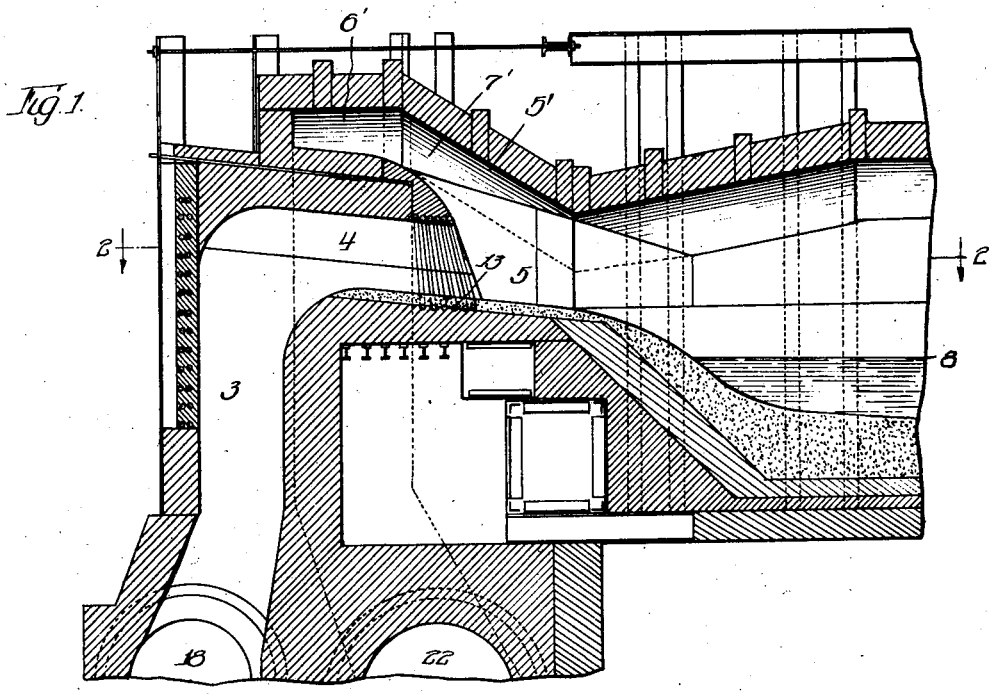
Figure 1 is a fragmentary sectional elevation of one port portion of an open hearth furnace constructed according to my invention.

As shown in the drawing, the gas is led to the furnace from the gas producers (not shown) by the pipes 14 and passes through the valve 15 and passage 16 to the regenerator 17. From the regenerator it passes through the slag pocket 18 to the uptake 3 and then through the downwardly inclined and gradually constricted port 4 to the mixing chamber 5. The air is supplied through the reversing valve 19, flue 20, regenerator 21, slag pocket 22 and uptakes 6 to the port 7. This port 7, as best shown in Figure 1, extends above the port 4 at 6', thus straddling that port. The roof of the port 7 inclines downwardly as shown and merges into the roof 5' of the mixing chamber 5.

In the form of furnace shown the air is forced through the valve 19 into the flue 20 by the fan 23. Means are provided whereby exhaust gases may be shut off from the stack 24 by the damper 25. The damper 26 being raised, the gases pass through the passage 27 to the superheater 28, then up through the waste heat boiler 29 and down through the similar boiler 30, being drawn by the draught fan 31 operated by the steam turbine 32. The gases then pass up through a flue 33 which leads upwardly to join the stack 24.

Figure 2:
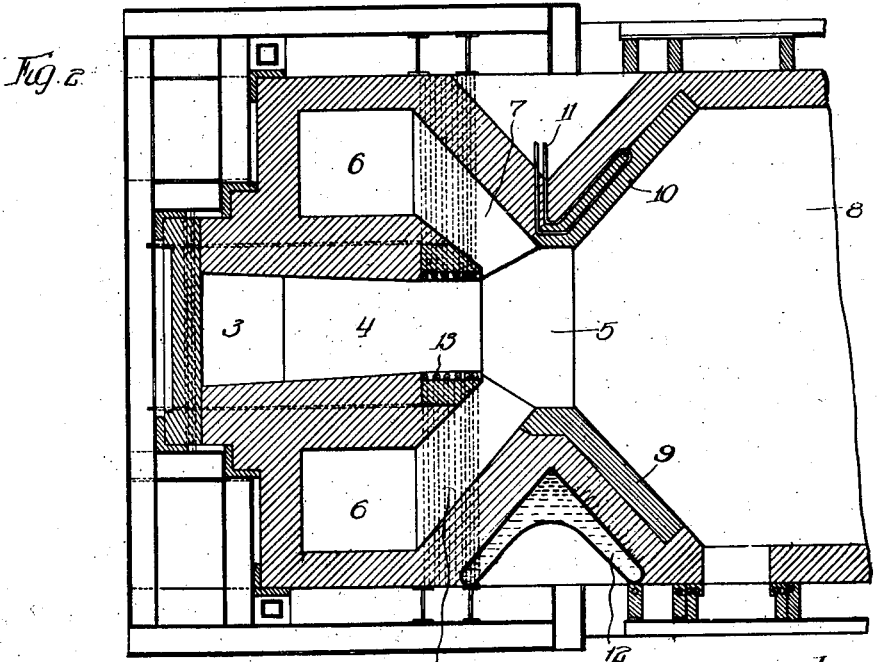
Figure 2 is a horizontal section taken on line 2—2 of Figure 1.
Figure 3:
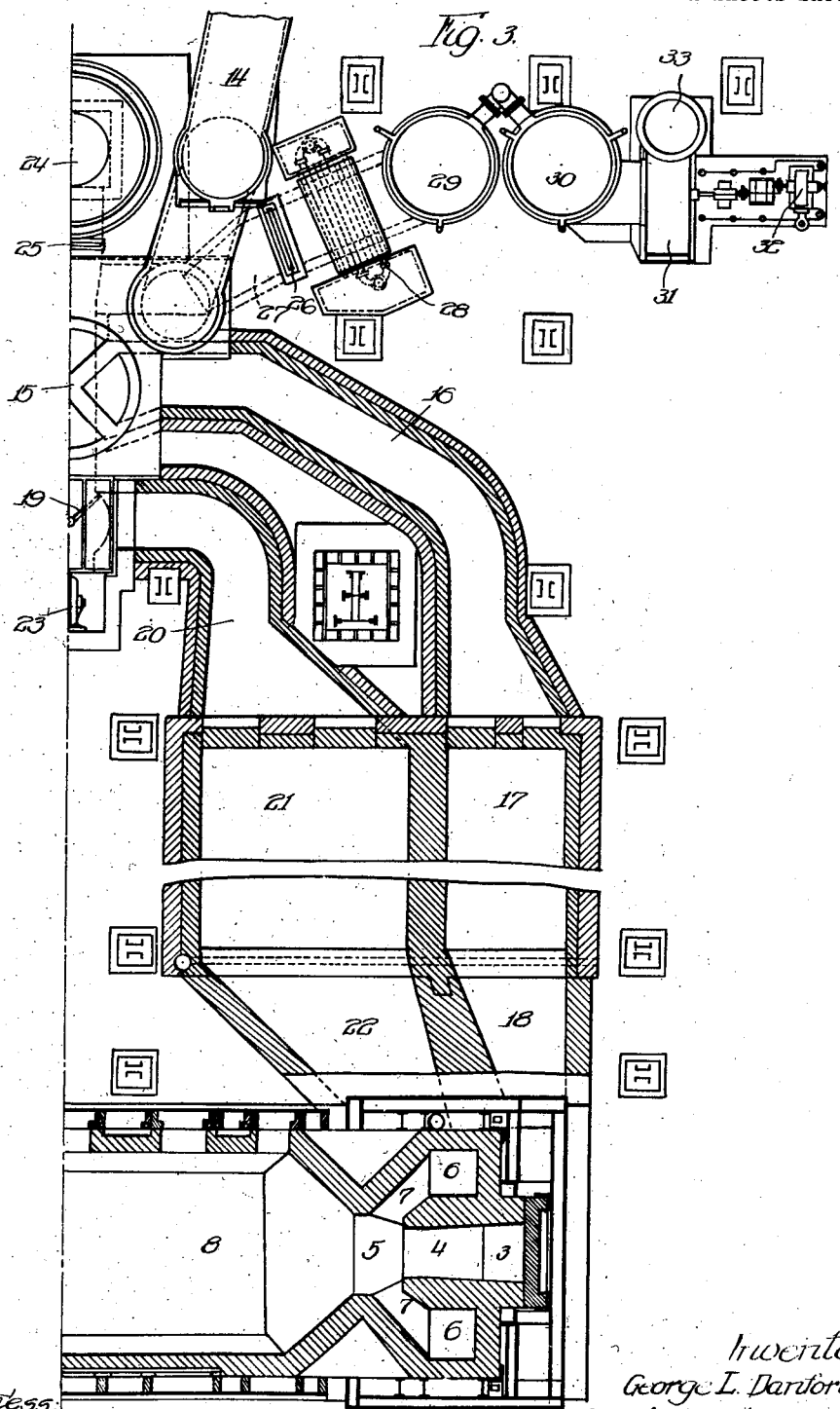
Figure 3 is a sectional plan illustrating the furnace layout.

The melting chamber 8 is necked down at 9 and 10 to meet the entrance to the mixing chamber 5. The angle of the portions 9 and 10 in the particular structure shown is substantially that of the ports 7. As shown in Figure 2, the portion 10 has been cooled by water pipes 11 and the portion 9 by the water container 12. Obviously either or both may be cooled in either manner or by any desired cooling construction. The entrance of the gas port 4 into the mixing chamber is also cooled with water circulating pipes 13.

In the operation of the furnace, when an end of the furnace is serving for inlet of air and gas, the heated gas comes through the uptake 3 from its regenerative chamber 17 and passes through the port 4 to mixing chamber 5. Simultaneously the heated air comes from its regenerative chamber 21 through the uptakes 6 and passes through the port 7 to the mixing chamber 5. As may be understood from reference to Figure 1, the air from the two uptakes commingles above the gas inlet port so that in the mixing chamber the gas stream is intersected by an air stream upon both sides and from above. The gas, being lighter, tends to rise through the air and it is therefore generally considered unnecessary to supply air from below the stream of gas.

The air and gas streams meeting at angles in the chamber 5 intermingle so that as they pass outwardly therefrom at high velocity into the furnace combustion takes place at and adjacent the inlet port and working heat is provided throughout the surface of the metal in the melting chamber. The opposite end of the furnace is identical in construction to that shown and the burnt gases pass out through the opposite mixing chamber and are divided by the ports, the divided portions passing down through the air and gas uptakes to the other set of regenerative chambers. The necking down of the melting chamber at 9 and 10 together with the corresponding increase in area of the ports 4 and 7, is of particular importance in facilitating discharge of the burnt gases.

Obviously a slightly greater draft is required to secure passage of the exhaust gases through the necked mixing chamber than would be necessary where the several air and gas ports are of greater area and open directly into the furnace. With a furnace of the design shown in the drawing, however, this increased draft is but a small portion of the entire draft required by the furnace and hence requires no material increase in the draft supplying means of the furnace. The small increase in power required by the draft means is very much more than offset by the increased efficiency of the furnace.

The port may be so designed as not to require any draft other than that naturally induced in the stack, mechanical draft means being provided in the furnace shown primarily because of the draft retarding effect of the superheater and the exhaust heat boilers.

The area of the port between the mixing chamber 5 and melting chamber 8 of the furnace is to a degree self-regulating in that in a new furnace with clean checkerwork and no obstructions in the several flues and uptakes, the resistance offered to the passage of the exhaust gases by these elements is at its lowest, and at the same time the area of the port is at its minimum. As the furnace operation continues, the checkerwork and flues become somewhat obstructed with flue dirt, thereby increasing the resistance to the gases and at the same time the brick work forming the port is gradually worn away, thus increasing the area of the port. In this way the resistance offered by the port decreases as that offered by the checkerwork and flues increases.

An important advantage of the construction of the present invention consists in the fact that since the air is adequately mixed with the fuel it is not necessary to use the large excess of air required in the conventional type of furnace in order to secure complete combustion. This elimination of excess air avoids the loss due to the necessity of heating and exhausting this air and further has a beneficial effect in that there is no over-oxidation of the product of the furnace. As has been stated, the aspirating or siphon effect of the incoming gas stream upon the air renders the quantity of air used substantially self-regulating.

With a furnace constructed according to my invention and operated as described, it has been found that production can be increased approximately twenty per cent, and the consumption of fuel per ton of product correspondingly decreased. The cost of operating items chargeable against each ton of product is very materially decreased.

While the specific construction shown and described herein is particularly adapted to provide in furnaces using producer gas, a mixing chamber and relatively small incoming port common to the air and fuel, together with means for introducing the fuel and air thereto, impelling them into a desirable mixture, causing combustion which provides working temperature throughout the surface of the metal, and then adequately exhausting the waste products of combustion, it is to be understood that changes may be made in the details of construction to adapt the invention to varying working conditions and uses. For example, for application to furnaces using other than producer gas for fuel, the several elements will be modified as necessary for the utilization of the particular fuel to be burned.

I claim:

1. In an open hearth furnace, a melting chamber, a gas uptake, a gas passage decreasing in size from the gas uptake to the gas port, air uptakes, an air passage decreasing in size from said uptakes to an air port located adjacent the gas port, and the lateral walls being bowed inwardly to form a mixing chamber into which said ports discharge, the mixing chamber being provided with a port into the melting chamber, this port having a smaller area than the combined areas of the gas and air ports.

2. In an open hearth furnace, gas and air ports at either end, the lateral walls being bowed inwardly adjacent said ports, the space between the opposed bowed portions being greater in area than the gas port, and less in area than the combined areas of the gas and air ports.

3. In an open hearth furnace, a melting chamber, air and gas passages entering either end of the chamber through a restricted port, the passages and the adjacent portion of the melting chamber being so related to the port as to form approximately a Venturi section whereby movement of gases through the port is facilitated.

4. In an open hearth furnace, a melting chamber, air and gas passages entering either end of the chamber through a restricted port, the passages and the floor, roof and lateral walls of the melting chamber being so related to the port as to form approximately a Venturi section whereby movement of gases in either direction through the port is facilitated.

5. The method of operating an open hearth furnace which consists in conducting a heated gas in a stream gradually decreasing in cross-sectional area into union with a stream of fluid to produce a combustible mixture, contracting the area of said mixture to less than the combined areas of the streams of said gas and fluid prior to their union, gradually expanding the area of said mixture in the melting chamber of said furnace, burning said mixture within the said melting chamber, gradually contracting the area of the stream of the products of combustion within said melting chamber, and gradually expanding the area of the stream of the products of combustion after withdrawal from the melting chamber, whereby said products of combustion will pass from said melting chamber at relatively high velocity.

6. The method of operating an open hearth furnace which consists in conducting heated air in a stream gradually decreasing in cross-sectional area into union with a stream of fuel to produce a combustible mixture, contracting the area of said mixture to less than the combined areas of the streams of said air and fuel prior to their union, gradually expanding the area of said mixture in the melting chamber of said furnace, burning said mixture within said melting chamber, gradually contracting the area of the stream of the products of combustion within said melting chamber, and gradually expanding the area of the stream of the products of combustion after withdrawal from the melting chamber, whereby said products of combustion will pass from said melting chamber at relatively high velocity.

7. The method of operating an open hearth furnace, which consists in conducting a heated gas in a stream gradually decreasing in cross-sectional area into union with a stream of fluid to produce a combustible mixture, contracting the area of said mixture to less than the combined areas of the streams of said gas and fluid prior to their union, gradually expanding the area of said mixture in the melting chamber of said furnace, and burning said mixture within said melting chamber.

8. The method of operating an open hearth furnace which consists in conducting air in a stream gradually decreasing in cross-sectional area into union with a stream of fuel to produce a combustible mixture; contracting the area of said mixture to less than the combined areas of the streams of said air and fuel prior to their union; gradually expanding the area of said mixture in the melting chamber of said furnace, and burning said mixture within said melting chamber.

9. The method of operating an open hearth furnace which consists in conducting heated air in a stream gradually decreasing in cross-sectional area into union with a stream of fuel to produce a combustible mixture, gradually reducing the area of the stream of said mixture, gradually expanding the area of said mixture in the melting chamber of said furnace, burning said mixture within said melting chamber, gradually contracting the area of the stream of the products of combustion within said melting chamber, and gradually expanding the area of the stream of the products of combustion after withdrawal from the melting chamber, whereby said products of combustion will pass from said melting chamber at relatively high velocity.

10. In an open hearth furnace, a melting chamber, air and gas regenerators and slag pockets, port ends connecting the slag pockets and melting chamber, each port end comprising a mixing chamber provided with a port discharging into the melting chamber, gas and air ports discharging into the mixing chamber, passages leading to said gas and air ports and approximately vertical passages connecting the first named passages and the slag pockets, the area of the port between the mixing and melting chambers being less than the combined areas of the approximately vertical passages, the walls on both sides of the port between the mixing and melting chambers inclining to form approximately a Venturi section.

Signed at Chicago, Illinois, this 4th day of January, 1921.

GEO. L. DANFORTH, Jr.